United States Patent
Wu

(10) Patent No.: US 7,334,651 B2
(45) Date of Patent: *Feb. 26, 2008

(54) KICK WARNING SYSTEM USING HIGH FREQUENCY FLUID MODE IN A BOREHOLE

(75) Inventor: Peter T. Wu, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 155 days.

This patent is subject to a terminal disclaimer.

(21) Appl. No.: 10/710,569

(22) Filed: Jul. 21, 2004

(65) Prior Publication Data

US 2006/0016592 A1    Jan. 26, 2006

(51) Int. Cl.
*E21B 47/00* (2006.01)
(52) U.S. Cl. .................... 175/48; 175/38; 73/152.58
(58) Field of Classification Search .............. 175/38, 175/48; 73/152.16, 152.54, 152.55, 152.58
See application file for complete search history.

(56) References Cited

U.S. PATENT DOCUMENTS

| | | | |
|---|---|---|---|
| 4,147,222 A | 4/1979 | Patten et al. | |
| 4,208,906 A * | 6/1980 | Roberts, Jr. | 73/152.32 |
| 4,273,212 A | 6/1981 | Dorr et al. | |
| 4,628,725 A * | 12/1986 | Gouilloud et al. | 73/19.03 |
| 4,698,793 A | 10/1987 | Wu | |
| 4,733,232 A | 3/1988 | Grosso | |
| 4,733,233 A | 3/1988 | Grosso et al. | |
| 4,813,028 A | 3/1989 | Liu | |
| 5,006,845 A | 4/1991 | Calcar et al. | |
| 5,154,078 A | 10/1992 | Codazzi | |
| 5,163,029 A | 11/1992 | Bryant et al. | |
| 5,205,166 A | 4/1993 | McCann et al. | |
| 5,275,040 A | 1/1994 | Codazzi | |
| 5,278,805 A | 1/1994 | Kimball | |
| 5,829,530 A | 11/1998 | Nolen | |
| 5,952,569 A | 9/1999 | Jervis et al. | |
| 5,975,219 A | 11/1999 | Sprehe | |
| 6,176,323 B1 | 1/2001 | Weirich et al. | |
| 6,257,354 B1 | 7/2001 | Schrader et al. | |
| 6,371,204 B1 | 4/2002 | Singh et al. | |
| 6,394,195 B1 | 5/2002 | Schubert et al. | |
| 6,552,962 B1 | 4/2003 | Varsamis et al. | |
| 6,618,322 B1 | 9/2003 | Georgi | |
| 6,631,327 B2 | 10/2003 | Hsu et al. | |
| 6,868,920 B2 * | 3/2005 | Hoteit et al. | 175/25 |
| 6,957,572 B1 * | 10/2005 | Wu | 73/152.16 |
| 2002/0134587 A1 * | 9/2002 | Rester et al. | 175/48 |
| 2003/0057366 A1 | 3/2003 | Gzara et al. | |
| 2004/0003658 A1 * | 1/2004 | Han et al. | 73/152.47 |
| 2004/0006428 A1 | 1/2004 | Hsu et al. | |
| 2004/0095847 A1 | 5/2004 | Hassan et al. | |
| 2004/0095874 A1 | 5/2004 | Hassan et al. | |

* cited by examiner

*Primary Examiner*—David Bagnell
*Assistant Examiner*—Robert Fuller
(74) *Attorney, Agent, or Firm*—Karen Singh; Jaime Castano; Dale Gaudier

(57) ABSTRACT

Techniques for detecting a kick in a borehole include acquiring a set of measurements with a sonic tool in the borehole; determining borehole mud slowness from the set of measurements; and comparing the mud slowness with a selected criterion, wherein the determining the mud slowness includes determining fluid mode slowness as a function of frequency for at least one fluid mode, and determining the mud slowness from the fluid mode slowness.

18 Claims, 9 Drawing Sheets

KICK WARNING SYSTEM USING HIGH FREQUENCY FLUID MODE IN A BOREHOLE

BACKGROUND OF INVENTION

1. Field of the Invention

The invention relates generally to kick detection and monitoring in a borehole. More particularly, this invention relates to methods and systems for kick detection based on mud slowness.

2. Background Art

Well control is an important aspect of oil and gas exploration. When drilling a well in oil and gas exploration, various measures should be put in place to prevent injury to personnel and equipment associated with the drilling activities. For example, drilling fluids (mud) should have a proper weight to prevent the formation fluids from rushing into the wellbore. Even with all the precautions, penetration of unexpected high-pressure zones in the formation is unavoidable. When this occurs, high-pressure fluids typically flow into the wellbore, and the well is said to have taken a "kick."

The pressure increase associated with a kick results from the influx of formation fluids (a liquid, a gas, or a combination thereof) from the higher-pressure formation into the wellbore. The high-pressure kick will propagate from the point of entry in the wellbore uphole (i.e., from a high pressure region to a low pressure region). If the kick is allowed to reach the surface, drilling fluid, well tools, and other drilling structures may be blown out of the wellbore. These "blowouts" may result in catastrophic destruction of the drilling equipment and injury or death of personnel.

Kick is one of the biggest safety issues a driller faces. Every year, kick/blowout incidents cost the industry millions of dollars. While various measures (e.g., blowout preventers; BOP) are available that can reduce the risk of blowouts after a well takes a kick, it would be more effective if there were a way to predict or detect an impending kick and blowout. Early detection of an incipient kick can warn the driller and provide valuable time to plan a measure to kill the kick and to avoid a catastrophe. On the other hand, if a kick is detected late, it may be necessary to trip the drill string, to perform kick control measures such as circulating out the kick gas, or to activate the blowout preventers. All these measures are very costly. Even worse, if a kick is detected too late to have proper measures initiated, it could result in a blowout, leading to catastrophic damages to the equipment and/or personnel. Therefore, methods and systems that can monitor and detect a kick early are very valuable.

Most kick detection methods are based on monitoring the drilling fluid volume, flow rate, or pressure changes. For example, U.S. Pat. No. 6,371,204 issued to Singh et al. discloses a method for detecting a kick by carefully monitoring the fluid volumes that are being pumped into the drill string and being returned to the surface. By comparison or totaling of the calculated volume, it is possible to detect unwanted fluid flexes between the wellbore and an underground formation. The fluid volumes may be determined by monitoring the fluid levels, using a sonic or acoustic sensor that can provide a measure of the fluid interface.

Acoustic sensors may also be used in a different manner to detect a kick. For example, U.S. Pat. No. 4,273,212 issued to Dorr et al. discloses a method that uses acoustic sensors to monitor the distance from the rig to the bottom of the wellbore while drilling. An acoustic sensor at the surface transmits a signal into the mud column. The acoustic signal travels downhole and is reflected from the collar of the drilling assembly back to the rig. The distance between the rig and the bottom hole assembly (BHA) can be calculated and used to monitor the drilling process. If there is any influx of formation fluids (especially gases), the acoustic signals will be significantly altered. Thus, influx of formation fluids will produce aberrations in the signal travel times (hence, the calculated distances). Any such change may signal a kick.

U.S. Pat. No. 4,733,233 issued to Grosso et al. and U.S. Pat. No. 4,733,232 issued to Grosso disclose a method that uses a downhole acoustic source to produce acoustic signals and then uses two pressure transducers at the surface to sense annular acoustic waves in the returning mud flow and to sense annular acoustic waves in the drill string. A change in the amplitude of the annulus signal relative to the amplitude of the drill string signal is used to indicate the presence of a borehole fluid influx.

U.S. Pat. No. 5,154,078 issued to Codazzi discloses two methods for kick detection while drilling. The first method is based on the standing wave patterns generated by pressure oscillations of the drilling rig mud pumps. Such standing wave patterns form time sequences of maximum and minima, which may be monitored to derive the phase and period of the standing waves. A continuous increase in the phase difference between annulus and drill string standing waves may indicate a kick. The second method proposed in this patent uses acoustic signals from a downhole source near the bottom of the borehole. If there is a gas influx into the wellbore (annulus), the acoustic signals travel in the annulus at a different speed from that in the interior of the drill string. Thus, a difference in the arrival times exceeding a criterion may signify a kick.

Another approach is to monitor the pressure changes in the mud column. Most dangerous kicks result from gas influx. Once the gas flows into the wellbore, it will alter the hydraulic pressure of the mud column. Therefore, pressure sensors can provide a sensing means for monitoring the influx of gases. An example of this approach can be found in U.S. Pat. No. 6,176,323 issued to Weirich et al.

While various kick detection techniques exist, there is a continued need for improved methods and systems that can provide early kick warning to further improve the safety of subsurface exploration and production operations.

SUMMARY OF INVENTION

One aspect of the invention relates to methods for detecting a kick in a borehole. A method in accordance with one embodiment of the invention includes acquiring a set of measurements with a sonic tool in the borehole; determining borehole mud slowness from the set of measurements; and comparing the mud slowness with a selected criterion, wherein the determining the mud slowness comprises: determining fluid mode slowness as a function of frequency for at least one fluid mode, and determining the mud slowness from the fluid mode slowness.

One aspect of the invention relates to systems for detecting a kick in a borehole. A system in accordance with one embodiment of the invention includes a sonic sensor configured to acquire a set of sonic measurements in the borehole; a circuitry configured to determine borehole mud slowness from the set of sonic measurements and to compare the determined mud slowness with a selected criterion, wherein the mud slowness is determined from a fluid mode slowness derived from the set of sonic measurements; and a telemetry link configured to send a warning signal uphole when the mud slowness exceeds the selected criterion.

One aspect of the invention relates to systems for detecting a kick in a borehole. A system in accordance with one embodiment of the invention includes a sonic sensor configured to acquire a set of sonic measurements in the borehole; processor means adapted to determine borehole mud slowness from the set of sonic measurements and to compare the determined mud slowness with a selected criterion, wherein the mud slowness is determined from a fluid mode slowness derived from the set of sonic measurements; and the processor means configured to trigger a warning signal when the mud slowness exceeds the selected criterion.

Other aspects and advantages of the invention will be apparent from the following description and the appended claims.

DETAILED DESCRIPTION

Embodiments of the invention relate to systems and methods for monitoring and detecting kicks in a borehole. A method in accordance with embodiments of the invention relies on measurements of mud slowness in the borehole to detect a kick. The mud slowness may be derived from the slowness of fluid modes, which are routinely observed in sonic waveforms, but are often regarded as unwanted components and are typically removed during data processing.

Kick is caused by influx of formation fluids, especially gases, when drilling into an over-pressured zone without a proper mud weight to balance the higher pore pressure. The formation fluids generally have substantially different slowness (inverse of velocity) from that of the drilling mud. Gases seeping from the formation into the wellbore, even a trace amount, will have a significant impact on the mud slowness. Therefore, monitoring the mud slowness in the wellbore in real-time could provide an early warning for an impending kick.

There are several possible ways to measure the mud slowness. One obvious way is to design a dedicated sensor sub-system in a BHA to measure the downhole mud slowness directly. Such a sub-system usually consists of an ultrasonic pulse-echo measurement system that is in direct contact with the mud in the wellbore. Due to the harsh downhole environment, it would be a challenge to design a robust sensor system on the outside of the drill collar.

An alternative to a dedicated measurement system is to estimate the mud slowness from sonic logs that are routinely obtained in logging operations. The inventor of the present disclosure discovered that the mud slowness can be derived from the high frequency asymptotes of various fluid modes, which are routinely observed in sonic waveforms, but are generally regarded as unwanted components and processed out. Co-pending U.S. patent application Ser. No. 10/710,128 filed on Jun. 21, 2004 discloses methods for using the fluid mode slowness to estimate the mud slowness. This co-pending application is assigned to the present assignee and is hereby incorporated by reference in its entirety.

Figure 1:
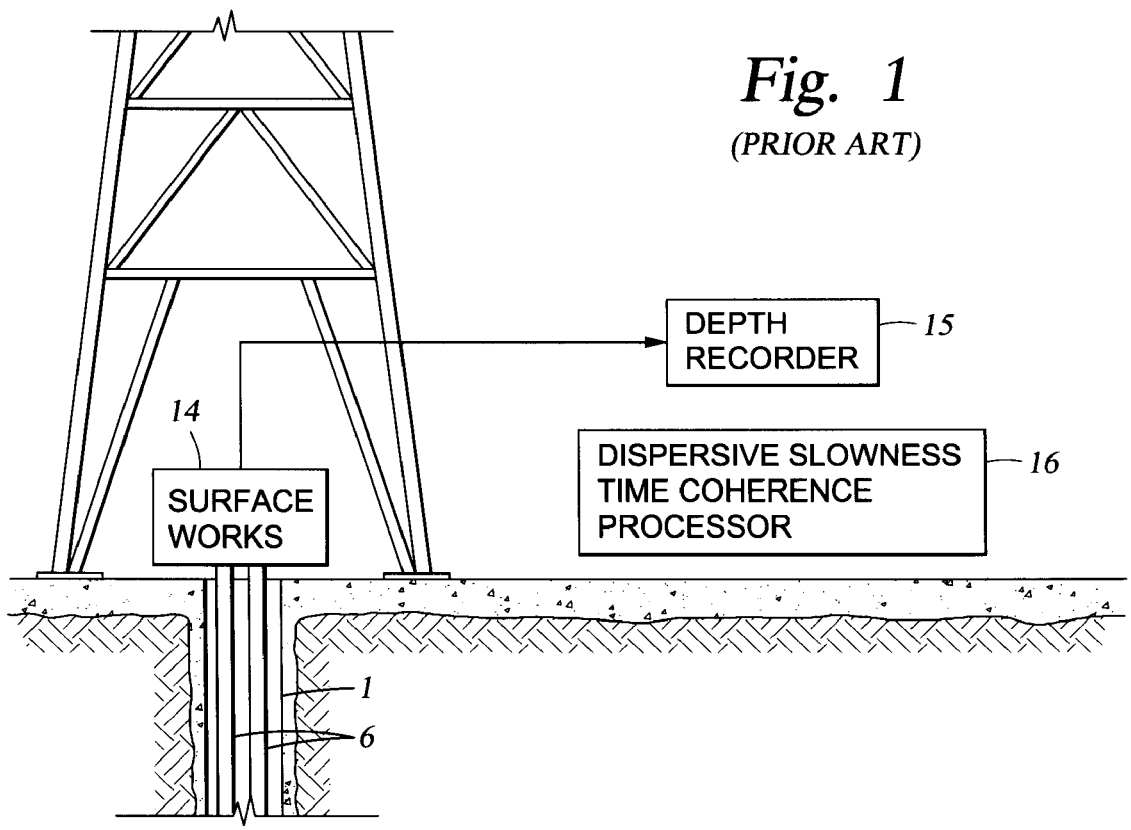
FIG. 1 shows a prior art sonic logging system.

Methods of the present invention may be practiced with sonic tools that are equipped with broadband high-frequency sources. Such a tool may be based on conventional tool designs with modifications. FIG. 1 shows a conventional logging-while-drilling (LWD) sonic system. As shown, a sonic tool 5 is incorporated into a drill string 6 traversing a borehole 1 in an earth formation 8. Tool 5 is connected within the drill string 6 above drill bit 7. Drill string 6 defines string outer surface 17 and mud channel 9. Sonic tool 5 includes a transmitter 10, which may be a monopole, dipole, quadrupole, or higher order pole source. The tool 5 also includes multiple receivers 11 spaced to form a receiver array 12 and receiver electronics 13. While FIG. 1 illustrates one particular configuration of a conventional sonic tool 5, in which the transmitter 10 is disposed above the receiver array 12, one of ordinary skill in the art would appreciate that a sonic (or acoustic) tool may have other configurations. For example, some tools may include a transmitter disposed below a receiver array, while other tools may have two transmitters symmetrically disposed above and below the receiver arrays to facilitate borehole compensation. Therefore, the particular configuration illustrated in FIG. 1 is not intended to limit the scope of the invention.

Surface works 14 include drill string support and drive mechanisms (not shown). Batteries or mud motor (not shown) in tool 5 provide electrical power to transmitter 10 and receiver electronics 13. The drill string provides depth data to depth recorder 15. Dispersive slowness time coherence processor 16 performs dispersive slowness time coherence processing on digital data from the tool and uses recorded time data to associate depth data with signal data. The sonic tool 5 of FIG. 1 is described in more detail in U.S. Pat. No. 6,631,327 issued to Hsu et al. and assigned to the present assignee.

Figure 1A:
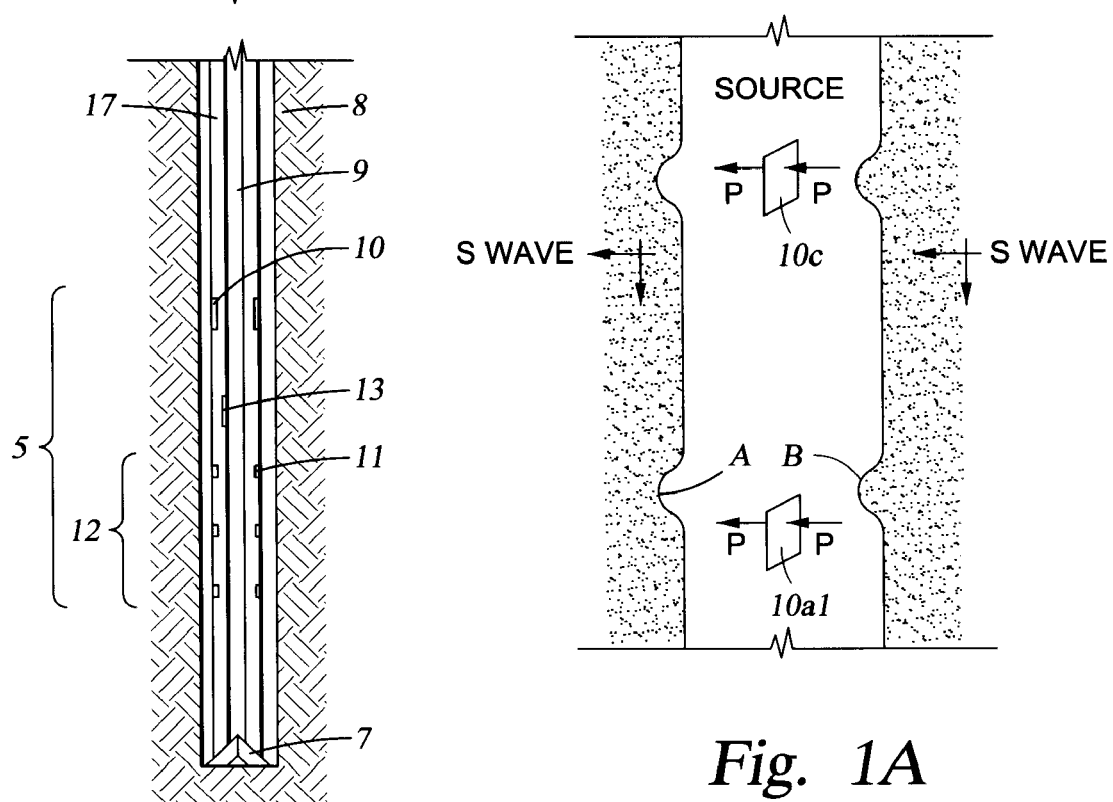
FIG. 1a illustrates a sonic logging using a conventional sonic tool in a borehole.

FIG. 1a illustrates the function of a dipole transmitter. In FIG. 1a, the dipole transmitter creates a positive pressure wave A on one side of a piston 10a1 and a negative pressure wave B on the other side of the piston. The positive wave A and the negative wave B propagate up the formation to a receiver 10c. The receiver 10c transmits dipole waveforms to the surface processor 16 using conventional telemetry means. Alternatively, the measured waveforms may be stored in the tool 5 for downhole processing or for later readout. The positive and negative waves A and B created by the dipole transmitter each may include a shear wave (S-wave), a compressional wave (P-wave) and a flexural wave.

Figure 2:
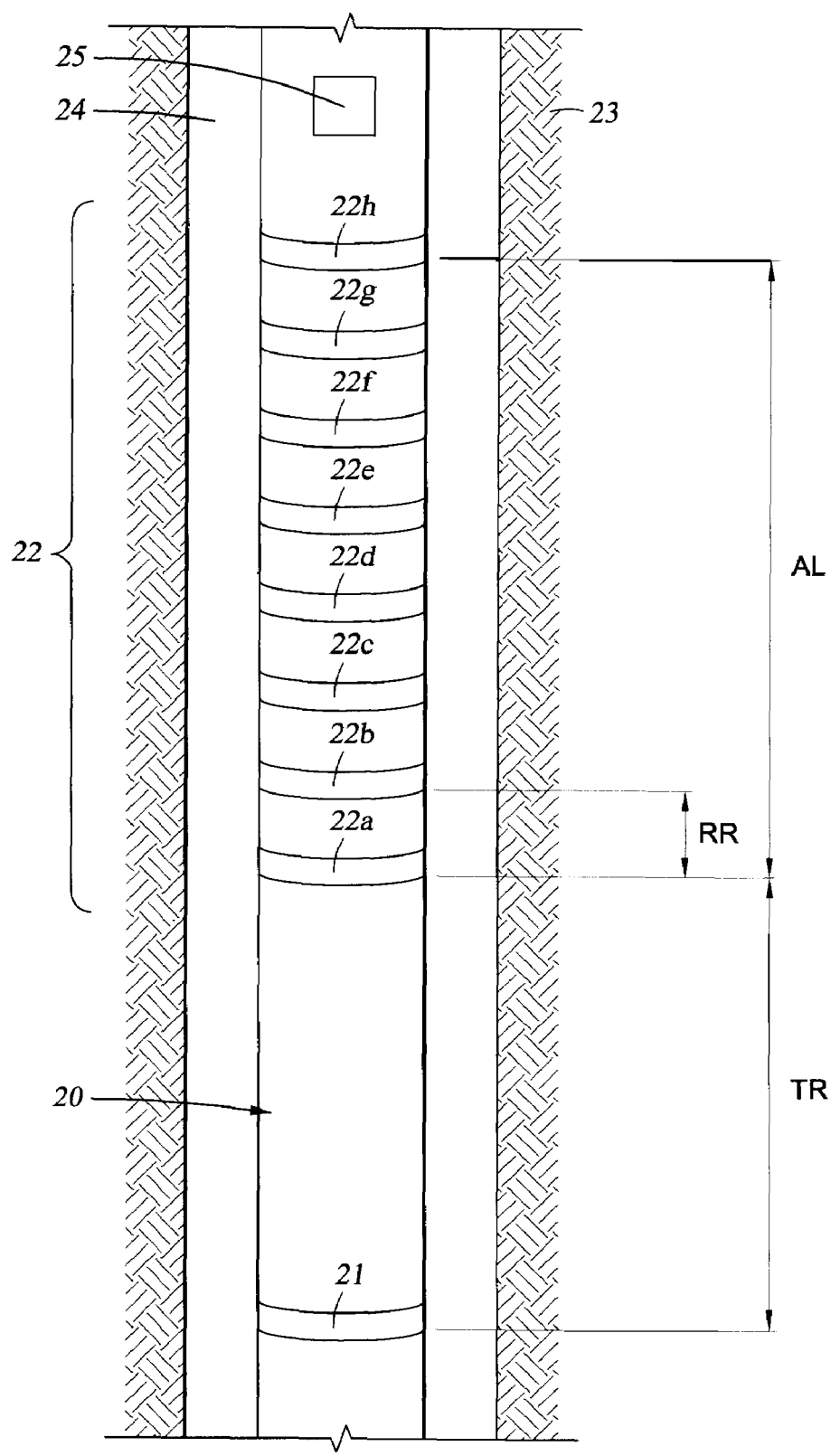
FIG. 2 shows a downhole sonic tool in accordance with one embodiment of the invention.

In accordance with embodiments of the invention, a sonic tool (sonic sensor) may include a transmitter capable of generating broadband high-frequency signals and an array of transducers (receivers) optimized for measuring relatively high-frequency waveforms. FIG. 2 shows a sonic tool 20 in accordance with one embodiment of the invention. As shown a sonic tool 20 is disposed in borehole 24 that penetrates a formation 23. The sonic tool 20 includes a transmitter 21 and a receiver array 22 that comprises 8 receivers 22a 22h. The transmitter and receivers may be of piezoelectric or other types of transducers. One of ordinary skill in the art would appreciate that the number of receivers in the array is only for illustration and is not intended to limit the scope of the invention.

The transmitter 21 preferably is a broadband transmitter that can operate in a relatively wide frequency range that covers relatively high frequencies. To efficiently excite fluid modes for determining mud slowness, the high ends of the frequency ranges (e.g., 30 KHz or higher) provided by a transmitter of the invention are typically higher than those (typically up to 20 KHz) used in a conventional sonic tool. For example, some embodiments of the invention can transmit signals from 0 KHz to 30 KHz, while other embodiments of the invention may be capable of even broader and higher frequency ranges, such as from 5 KHz to 500 KHz. Preferred embodiments of the invention can transmit signals from 10 KHz to 100 KHz. In some embodiments of the invention, the frequencies used are optimized for the specific type of formation and borehole under investigation such that more energy is transmitted at the frequency range that can efficiently excite the fluid modes in the particular formation-borehole combination. The transmitter 21 may be a monopole, dipole, quadrupole, or higher order pole source. Similarly, the receivers (transducers) 22 in the array are preferably responsive to the relative high frequencies and wide frequency range as transmitter 21. The receiver may a monopole, dipole, quadrupole, or higher order pole receiver. It is preferable that the receiver type match that of the transmitter.

The spacing between the transmitter 21 and the first receiver 22a, TR, could vary in a wide range, but preferably from 3 ft. [0.9 m] to 20 ft. [6.1 m]. A TR shorter than 3 ft. [0.9 m] may not provide sufficient room for the fluid mode to set up. A TR longer than 20 ft. [6.1 m] would likely require a large transmitter power, which is often limited by downhole conditions.

The inter-receiver spacings RR are preferably as small as practical to reduce aliasing effects. Because the transmitter 21 of the sonic tool 20 is designed to transmit relatively high frequency signals, the inter-receiver spacings RR may be smaller than the corresponding spacings on a conventional sonic tool. In some embodiments of the invention, the RR spacings may range from inches [centimeters] to 1 ft. [0.3 m], preferably from 0.1 ft. [3 cm] to 0.4 ft. [12.2 cm].

The array length (AL), i.e., the length of the receiver array, may also vary in a wide range. The AL preferably ranges from 2-5 ft. [0.6-1.5 m]. A preferred tool in accordance with embodiments of the invention ideally has a large AL and a small RR. However, the number of receivers on such an ideal tool would be large, which would be costly and may pose design issues. Therefore, the number of the receivers and the RR spacings should be selected such that the tool performs effectively, but without excessive costs. In some embodiments of the invention, the RR spacings are in the range of from 0.05 ft. [1.5 cm] to 1 ft. [0.3 m], preferably from 0.1 ft. [3 cm] to 0.4 ft. [12.2 cm], and the number of receivers in the array ranges from 3 to 100, preferably from 4 to 30. For example, an 8-receiver array with 0.4 ft. [12.2 cm] RR spacing is found to provide very good results.

The tool 20 also includes a processing unit (circuitry) 25, which may include a processor and a memory. The processing unit 25 may control the transmission of the source 21 and the acquisition of the waveform measurements by the receiver array 22. In addition, the processing unit 25 may perform downhole processing to derive the mud slowness, store the computed mud slowness as a function of time or as a function of well depth, compare the computed mud slowness with those determined earlier or with a pre-selected criterion to see if a kick is detected, and send a warning signal when a kick condition is detected. Note that these functions may also be performed by a computer on the surface (e.g., computer 16 in FIG. 1). The communications link between the tool 20 and the surface computer may be implemented via mud pulse telemetry or any other means known in the art.

The above-described transmitter and receiver system need not be a system exclusively for mud slowness measurement. In fact, a good economical design is to incorporate a broadband transducer and data acquisition system for mud slowness measurement into a conventional tool such that the same hardware system could be used for both regular sonic slowness measurements (P & S slowness) in the 0-20 KHz range as well as for mud slowness (through fluid modes) measurements in the higher frequency range (e.g., 10-100 KHz range). Some embodiments of the invention are equipped with a source and a receiver array capable of both regular slowness measurements and mud slowness measurements. The mud slowness measurements (with broadband higher frequency pulses) may be operated in a same or different firing cycle from that for the regular P & S wave measurements.

A method of the invention includes determining mud slowness, which may use a sonic tool equipped with broadband high-frequency transducers to perform sonic logging in a borehole. The broadband high-frequency logging is designed to excite various fluid modes in a frequency region where the slowness of the fluid modes approaches the slowness of the mud. Once the measurement data (waveforms) are available, the fluid modes in the measurement data are identified. Next, the mud slowness is determined from the slowness of various fluid modes in the high frequency region.

Methods of the invention are based on the discovery that the slownesses of various fluid modes are limited by the mud slowness in the high frequency range. Thus, the slowness dispersion curves of various fluid modes will asymptotically approach a limiting value (mud slowness) in the high frequency region. Accordingly, the slowness limit that represents the upper limit of the various fluid mode slowness dispersion curves may be regarded as the mud slowness. One of ordinary skill in the art would appreciate that various methods may be devised to find this limit. For example, a mud slowness extraction algorithm may be based on finding the slowness of a wave component (fluid mode) that has the flattest dispersion curve in a given frequency range defined by $[f_{min}\ f_{max}]$ and within a given mud slowness range defined by $[S_{min}\ S_{max}]$.

Figure 3:
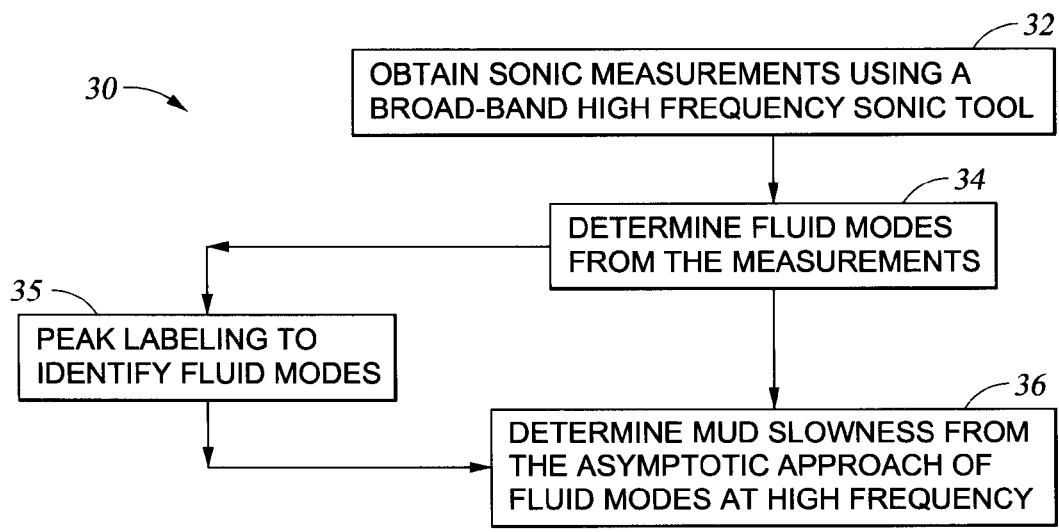
FIG. 3 shows a method for determining mud slowness in accordance with one embodiment of the invention.

FIG. 3 shows a schematic of a method for determining mud slowness in accordance with one embodiment of the invention. As shown, a method 30 includes the step of acquiring measurements using a tool capable of broadband high-frequency measurements, such as the one described above (step 32). The measurements include those at frequencies high enough to permit deriving the mud slowness from fluid mode asymptotes. Typically, the frequency range includes from about 5 KHz to about 500 KHz, preferably from about 10 KHz to about 100 KHz. Next, various fluid modes and their slownesses as functions of frequencies are determined from the measurement data (step 34). The steps involved in this determination will be described in more detail with reference to FIG. 4. These fluid modes may include Stoneley waves. These results may be plotted as slowness versus frequency to show the changes of the slownesses of various fluid modes as a function of excitation frequencies. Once these parameters are determined, the mud slowness can then be found from the asymptotic approaches of various fluid modes to limiting values, which represents the mud slowness (step 36). In some embodiments, the method may further include a step to label (or identify) fluid modes to be used to determine the mud slowness (step 35). The labeling step prevents mistaking Stoneley waves for a fluid mode, especially in a fast formation with a small borehole. This is discussed in detail with respect to FIG. 7 below.

Figure 4:
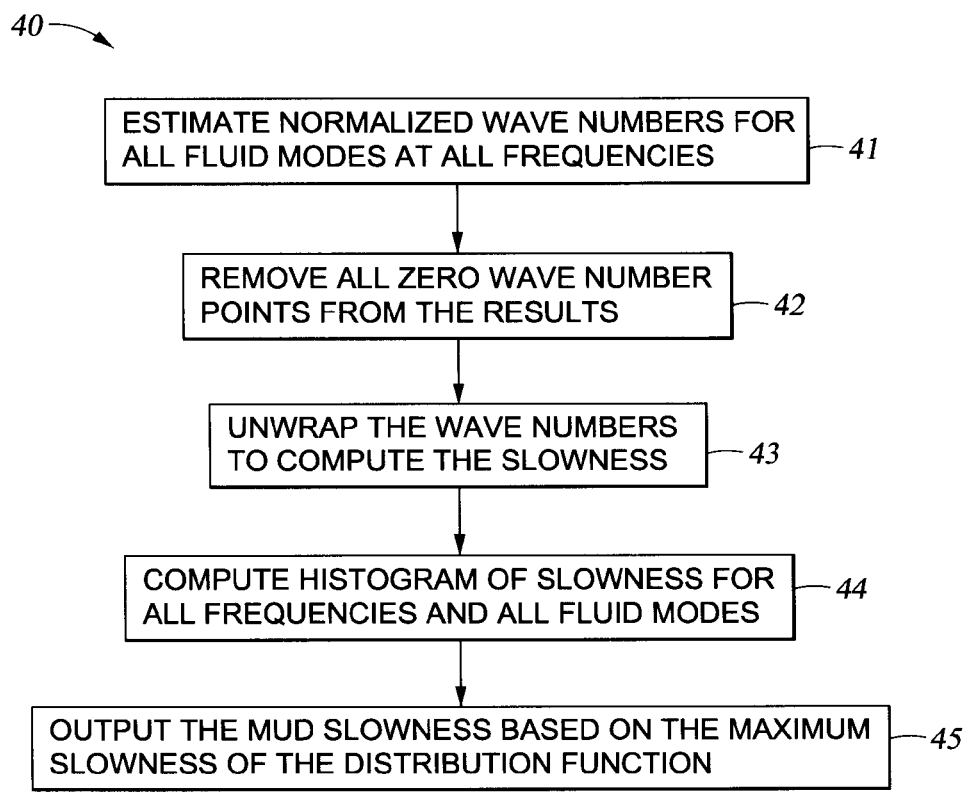
FIG. 4 shows a method for determining mud slowness in accordance with one embodiment of the invention.

FIG. 4 shows a method 40 for determining the various fluid modes from the measurement data (e.g., step 34 in FIG. 3). As shown, the process begins with estimating normalized wave numbers for all fluid modes at all frequency components (step 41). The estimation may use any method known in the art, including Prony's method. See Parks et al., "*Digital Filter Design*," pp. 226-228, Wiley & Sons, New York, 1987. The normalized wave numbers are estimated for all fluid modes at all frequency components and for all frequencies within the frequency range used in the measurements. Because the receivers in the array are designed to provide at least two waveform measurements for the highest frequency component, the maximum number of wave numbers is typically no more than one half the number of receivers (or waveforms measured). For example, the wave numbers, $K_j(f_i)$, are estimated for all fluid modes j=1, ..., n at all the frequency components centered at frequency $f_i$, where n≤(number of array waveforms)/2 and $f_{min} < f_i < f_{max}$ ($f_{min}$ and $f_{max}$ may be the minimum and maximum frequencies used in the measurements).

The normalized wave numbers, $K_j(f_i)$, thus estimated are inspected and any zero value points may be removed to simplify the analysis (step 42). Although removal of zero value points would simplify later processes, this step is optional.

To counter the aliasing effects, the normalized wave number may need to be unwrapped several times in order to obtain the correct slowness associated with the wave number. In step 43, based on the maximum expected mud slowness $S_{max}$ and the maximum frequency $f_{max}$ used in the measurements, the number of wraps needed to unwrap the normalized wave numbers, $K_j(f_i)$, is computed. The maximum number of wraps (m_max) needed is given by:

$$m\_max = \text{ceil}(f_{max} \times RR \times S_{max} - 1) \quad (1)$$

where ceil stands for rounding the value up to the next higher integer and RR is the inter-receiver spacing (see FIG. 2). The normalized wave numbers are then unwrapped in order to compute the corresponding slowness, $S_{jm}(f_i)$.

Once the normalized wave numbers are "unwrapped", the slowness for various wave components can be calculated (step 44). This is accomplished by computing the slowness for each wave component, $S_{jm}(f_i)$, at each frequency $f_i$ for each wrap m from the normalized wave number $K_j(f_i)$ at frequency component $f_i$ according to:

$$S_{jm}(f_i) = ((K_j(f_i) + m)/RR)/f_i, \quad (2)$$

where j=1, ..., n; and m=0, 1, ..., m_max.

Next, the method may include computing a histogram of $S_{jm}(f_i)$, for all $f_i$, j, and m (step 45). As noted above, the various fluid mode slownesses approach asymptotically to a value limited by mud slowness. Therefore, the slowness at the maximum of the distribution function (from the histogram) may be outputted as the mud slowness. The distribution function itself may also be outputted for quality control purpose, similar to the S/T projection from Slowness Time Coherence (STC) processing.

Due to noise, aliasing, or Stoneley wave interference, it is possible that the slowness at the maximum of the distribution is not the mud slowness. This is especially true for fast formation and small borehole conditions. With the distribution function as a quality control, it is possible to discern when this situation is likely encountered. If this situation is suspected to have been encountered, it is possible to use additional information (either from the adjacent depths or from known external constraints) to "re-label" (select) the slowness of another fluid mode (at a lesser peak of the distribution function) to derive the mud slowness.

Figure 5A:
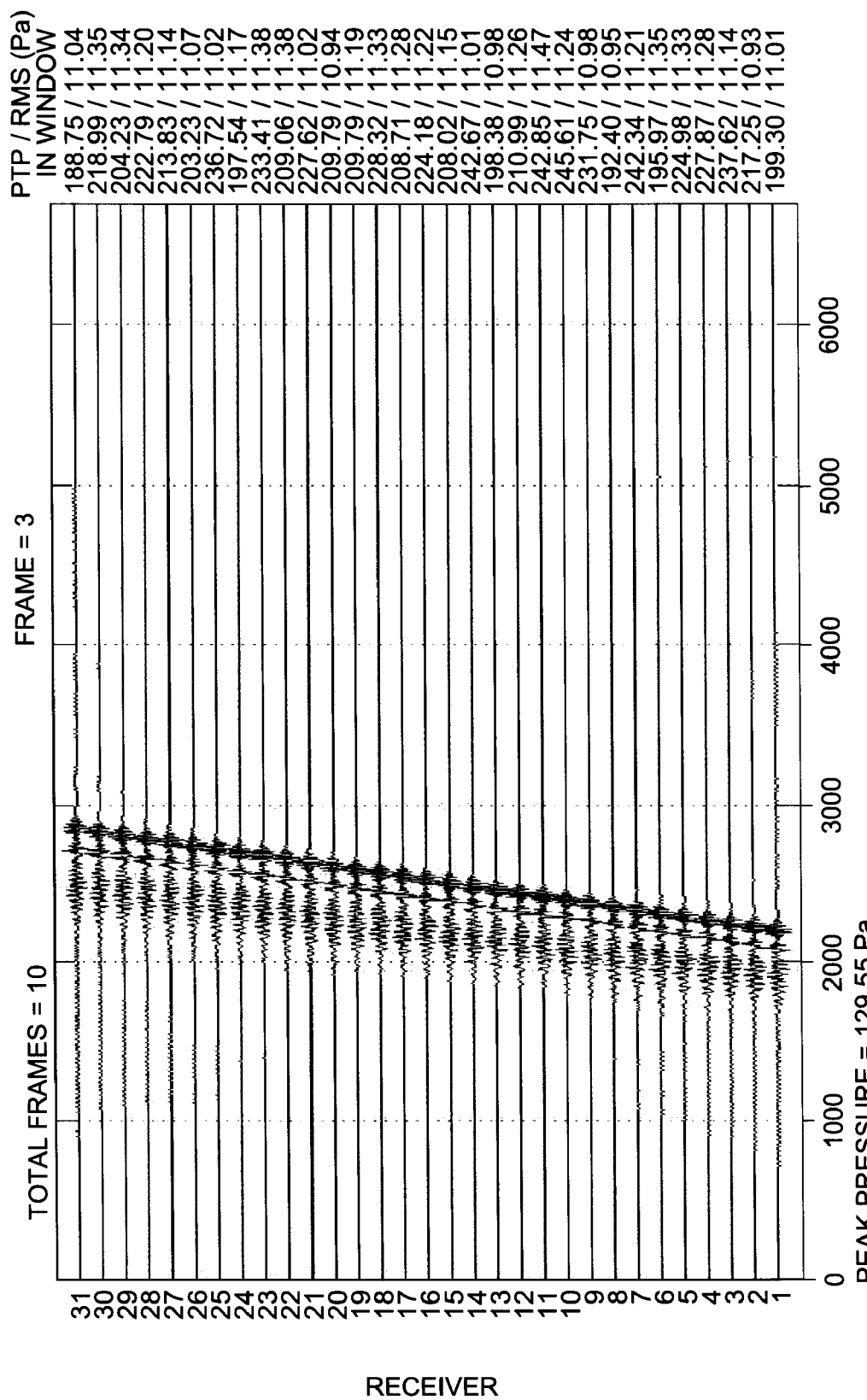
FIG. 5 shows one example of determining mud slowness using a method in accordance with one embodiment of the invention.
Figure 5B:
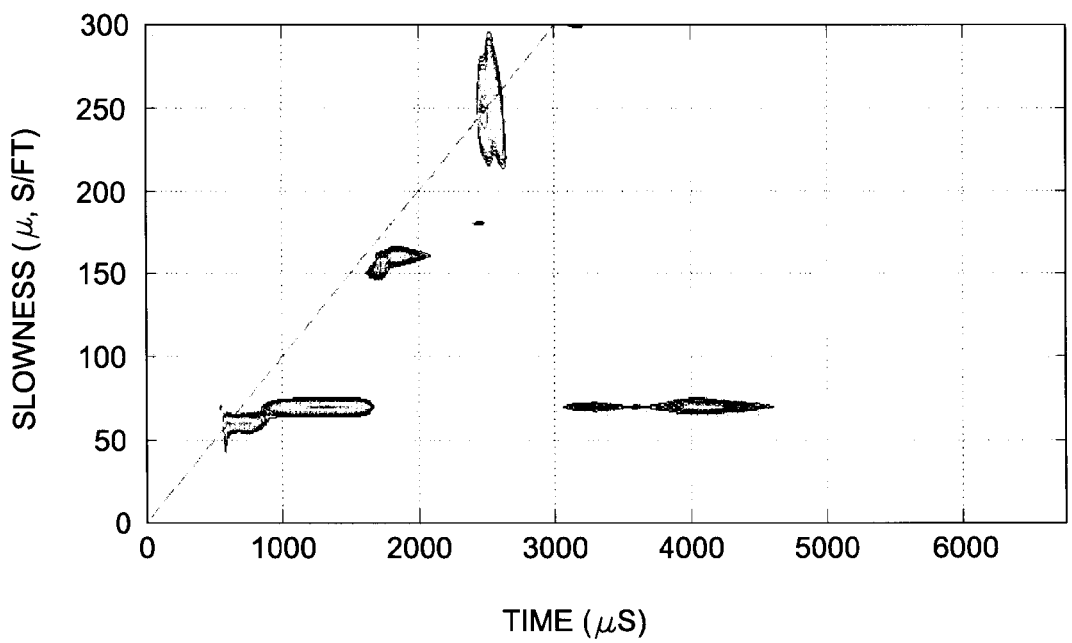

The application of a method for determining mud slowness as described above is illustrated in FIGS. 5 and 6, which show results from two very different situations. FIG. 5 shows the results for the case of a sonic tool on a 6.75 inch [17 cm] drill collar in a small borehole (HD=8.62 inch [21.9 cm], DTm=200 us/f) penetrating a fast formation (DTc=70 us/f, DTs=150 us/f). FIG. 6 shows the results for the case of a sonic tool on a 6.75 inch [17 cm] drill collar in a large borehole (HD=12.5 inch [31.7 cm], DTm=200 us/f) penetrating a slower formation (DTc=100 us/f, DTs=300 us/f). In both figures, the top plots (A) show the model waveforms as recorded by the receiver arrays, the middle plots (B) are the slowness-time planes showing the slownesses and times of various wave components detected by semblance processing (see Kimball et al., Geophysics, Vol. 49, pp. 264-281, 1984), and the bottom plots (C) are the dispersion curves extracted from the model waveforms using the Prony's method in accordance with one method of the invention (e.g., method 40 in FIG. 4).

Figure 5C:
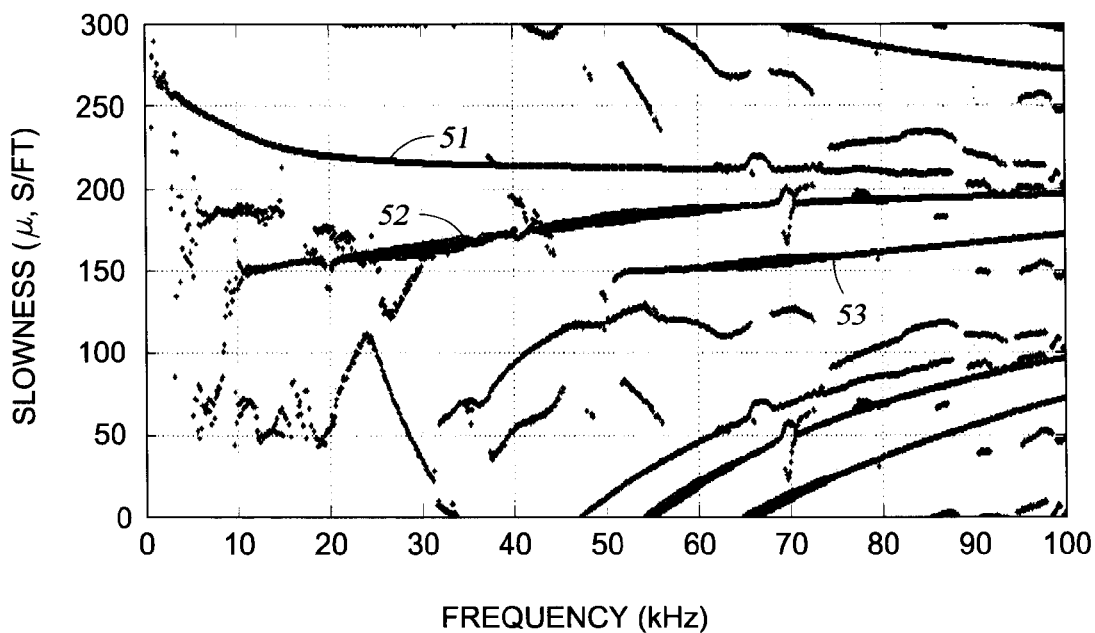
Figure 6A:
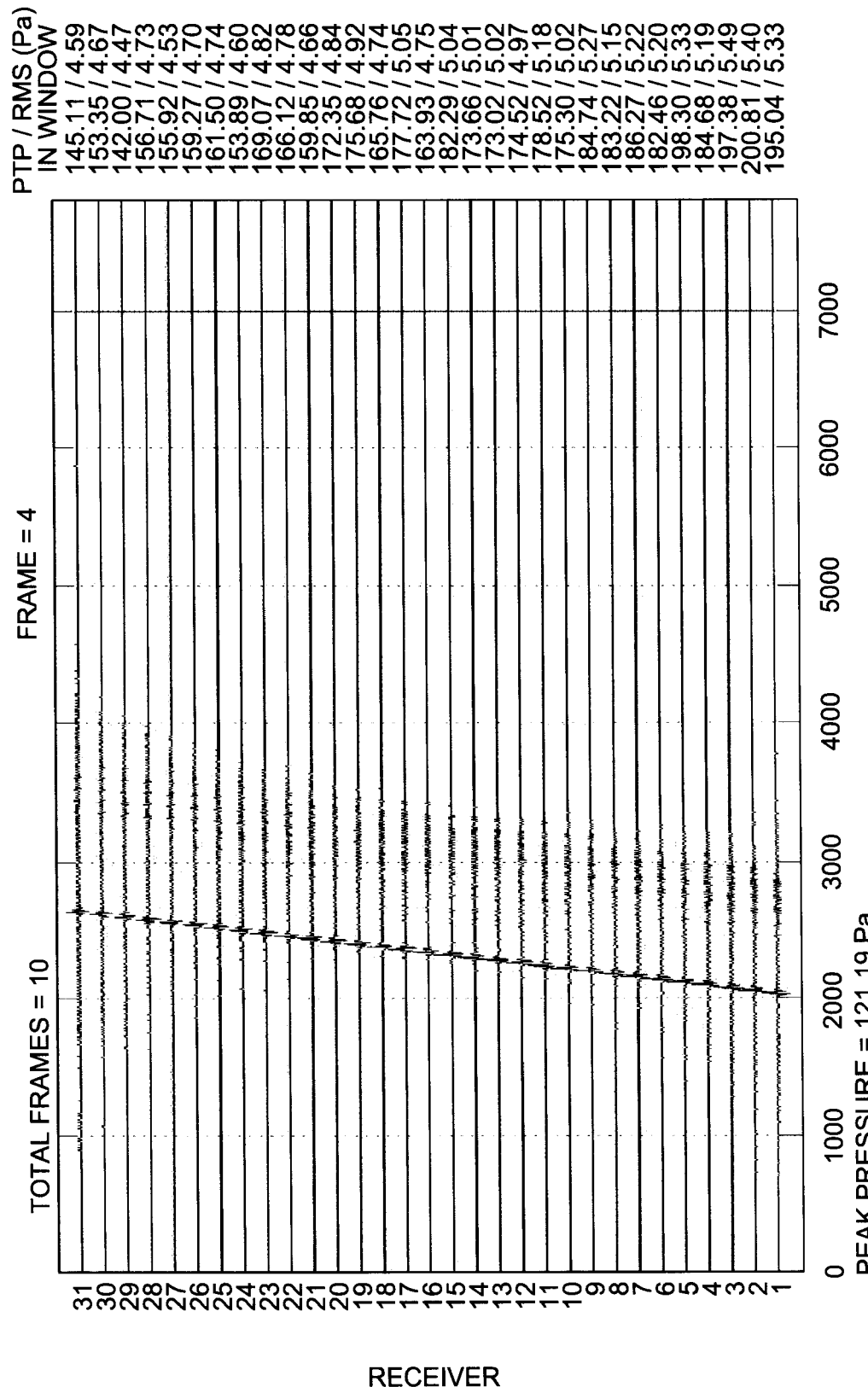
FIG. 6 shows another example of determining mud slowness using a method in accordance with one embodiment of the invention.
Figure 6B:
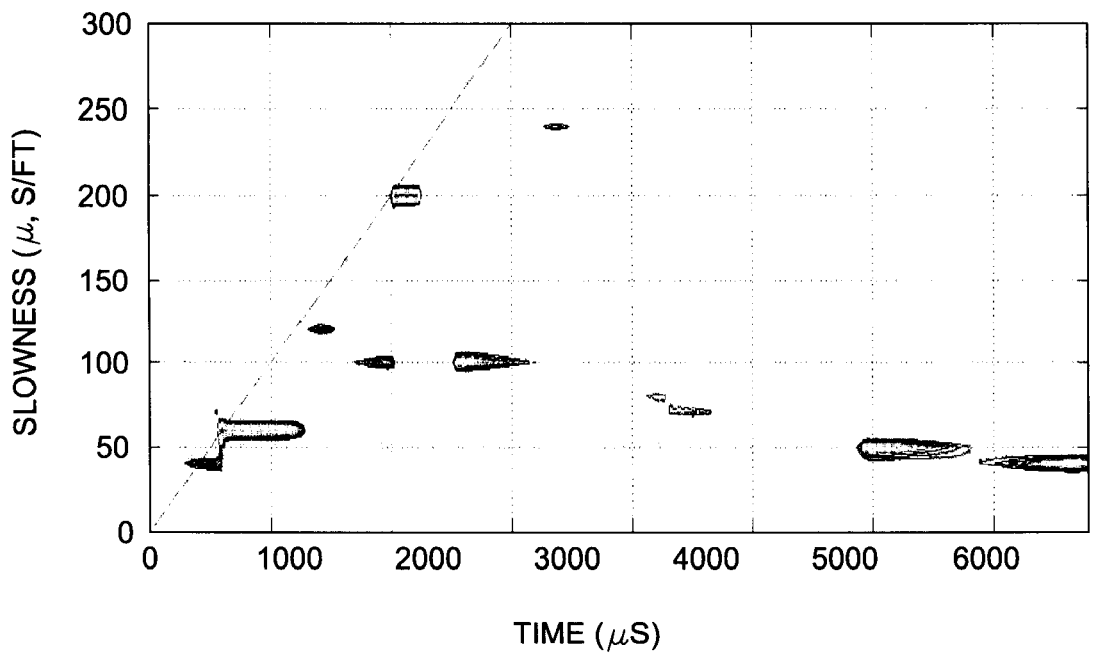

FIG. 5C shows that the Stoneley wave (curve 51) and two fluid modes (curves 52 and 53) are prominently excited. In addition, several other fluid modes are also discernable from the plot. It is apparent from this plot that most of the fluid modes are not excited until the source frequencies are relatively high. For example, the lowest order fluid mode (curve 52) is excited by frequencies of 10 KHz and higher, while the other fluid mode (curve 53) is not excited by frequencies lower than 50 KHz. Thus, some of these fluid modes are not detected using a conventional sonic tool.

FIG. 5C also shows that the slowness of the lowest order fluid mode (curve 52) starts around 150 us/f (which is the shear slowness for this case) at around 10 KHz and gradually increases with the increasing frequencies. The fluid mode slowness gradually increases and asymptotically approaches a limiting value, the mud slowness, in the 80-100 KHz range. This maximum value can be identified by various methods, e.g., curve fitting the dispersion curve 52 or using a histogram (e.g., step 44 in FIG. 4).

Similarly, other fluid modes (e.g., curve 53) may also be used to determine mud slowness. However, in most cases, the lowest order fluid mode (curve 52) is preferred because it is most prominently excited, is excited at relatively lower frequencies, and approaches the mud slowness at relatively lower frequencies.

Note that FIG. 5C shows that the mud slownesses of both curve 52 and curve 53 fluid modes are bounded above by the Stoneley wave slowness (curve 51). The Stoneley wave is prominently excited in most sonic logging operations. Therefore, the Stoneley wave dispersion curve can always be used to provide an upper bound of the mud slowness, even if no other fluid modes are discernable.

Figure 6C:
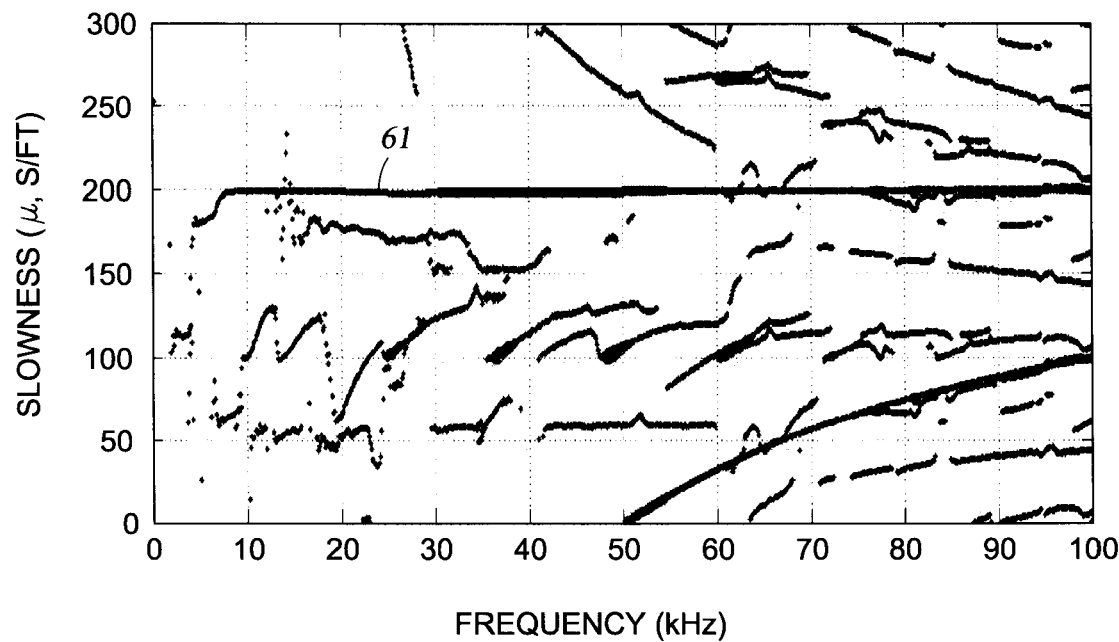

The results shown in FIG. 5C are for a fast formation and small borehole, a situation that requires higher excitation frequencies to reveal the asymptotic approach of the fluid mode to the mud slowness. In contrast, FIG. 6C shows results for a slow formation and a larger borehole, a situation where more sonic energy is transmitted by the mud column. As shown in FIG. 6C, the lowest order fluid mode dispersion curve (curve 61) reaches the mud slowness in the 10 KHz range, much lower than that required in the situation shown in FIG. 5C. This is because various fluid modes are more efficiently excited by the sonic source when the formation is slow and the borehole is relatively large. Results shown in FIGS. 5C and 6C are representative of two extremes that are likely to be encountered in sonic logging operations. Most wells will probably fall between these two cases.

Note that the above described sonic measurements and data processing may be performed downhole or on the surface. Once mud slowness can be accurately determined, it is possible to monitor changes in mud properties in the wellbore. For example, the mud slowness can be used to monitor or detect formation fluid influx into the mud column (i.e., a kick). In monitoring a kick, a trend of the mud slowness as a function of time or as a function of well depth (while drilling) is established as a baseline. Normally, the mud slowness will be a very slowly changing variable. Any abrupt change in mud slowness may signify possible influx of formation fluids and, therefore, will trigger a warning signal. The influx of formation fluids will occur almost instantly when the drill bit penetrates an over-pressured zone. Therefore, this warning signal from mud slowness will come earlier than many other real-time petro-physical measurements, such as compressional delta-t and resistivity, wherein measurement points are typically obtained many feet behind the bit. The compressional delta-t and resistivity are among the traditional real-time measurements that are used to detect overpressure zones by correlation.

Figure 7:
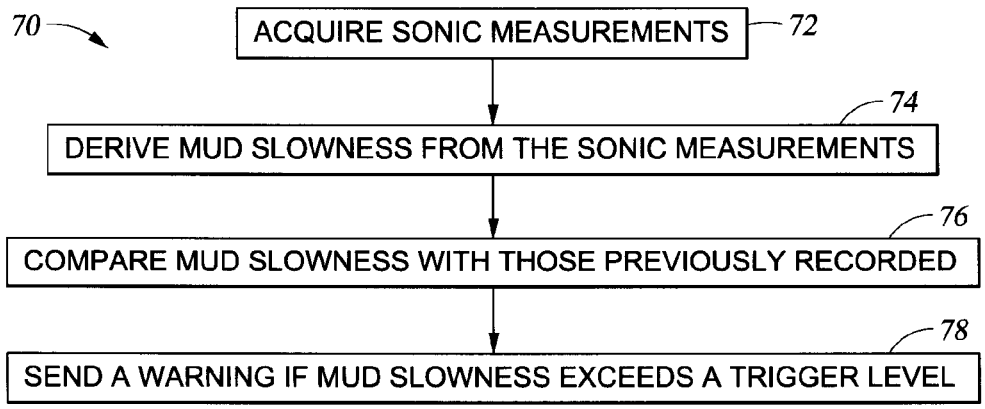
FIG. 7 shows a method for kick monitoring using a method in accordance with one embodiment of the invention.

FIG. 7 illustrates a method in accordance with one embodiment of the invention for detecting a kick in a wellbore. As shown, a method 70 may start by obtaining sonic measurements that preferably are acquired with a tool having a broad-band high-frequency source (step 72). Once the sonic measurements are available, the mud slowness is determined from the slowness of a fluid mode, such as by the asymptotic approach of the fluid mode slowness to a limiting value, i.e., the mud slowness (step 74). A method for such determination is described in detail above with reference to FIGS. 3 and 4. The mud slowness thus determined is recorded and/or compared with the mud slowness previously recorded (step 76). If the mud slowness is beyond a trigger level (a pre-selected criterion), then a warning signal is sent uphole to the driller or engineer (step 78). The method as shown in FIG. 7 may be used while drilling or in other phases of the operation (e.g., for well monitoring in a production well).

Figure 8:
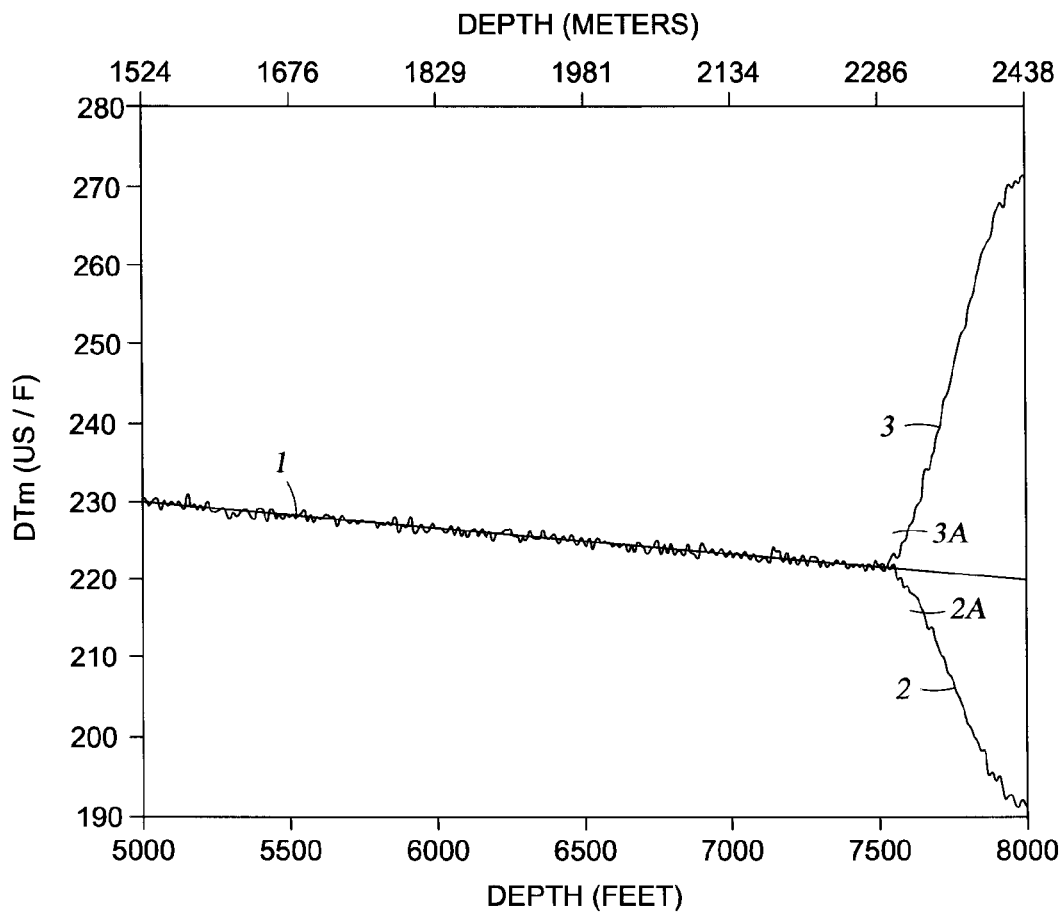
FIG. 8 illustrates a method for kick monitoring in accordance with one embodiment of the invention under various formation-borehole conditions.

FIG. 8 shows one embodiment of the invention used to monitor a kick as the well is being drilled. In accordance with this embodiment, the mud slowness as a function of depth may be used to detect any unusual changes in the mud slowness. FIG. 8 shows a chart (curve 1) of mud slowness as a function of depth in a well drilled with a typical oil base mud. Curve 1 shows a gradual change as a function of depth. This is because the temperature and pressure change over the depths. This change is gradual and predictable. Therefore, it is possible to set a limit (trigger level) for deviation from the normal trend, beyond which it would be considered that something unexpected (e.g., influx of formation fluids) has happened.

Influx of formation fluids from over-pressured zones will displace the mud slowness (DTm) from the normal trend. For gas influx, the DTm will increase drastically. For water influx, the DTm will decrease substantially. An early warning system in accordance with embodiments of the invention will catch the incipient influx and give the driller some precious lead-time to react. The driller's action may minimize the damage or even prevent the kick from becoming fully developed.

The trigger levels may be set relative to the expected values of the DTm or relative to the rate of the change. If set relative to the expected DTm value, the trigger level may be a certain percentage (or a certain slowness value) above or below the expected value. Alternatively, the trigger level may be set relative to a multiple of the standard deviation of the expected DTm values. Further, the trigger level may be set with respect to the expected rate of change (i.e., the slow decrease) of the DTm values.

In FIG. 8, curve 2 simulates water influx at a depth greater than 7500 feet [2286 m]. Water influx dramatically alters the DTm values in this region. A lower limit 2A may be set as a trigger level for water influx into the wellbore. Once the DTm values fall below this trigger level, the sensor may send a warning so that the driller is aware of the influx and can take proper actions.

Similarly, curve 3 in FIG. 8 simulates a hypothetical formation fluid (e.g., gas) influx into the wellbore. Gas influx significantly increases the DTm values in this region. An upper trigger level 3A may be set to signal such an influx. Note that different warning signals may be sent for water influx and for gas influx, if desired.

FIG. 8 illustrates a well being drilled with an oil-based mud. Embodiments of the invention may also be used to monitor a wellbore after drilling (e.g., to monitor a completed well). In this case, one or more sonic sensors may be placed at different depths in the wellbore to provide sonic measurements. The sonic measurements are used to derive mud slowness as described above. The mud slowness data are compared with those previously recorded, i.e., mud slowness as lapse of time is monitored. Any changes in the wellbore (e.g., kick) that alter the mud slowness may trigger an alarm so that the field engineers are notified of potential problems. The alarm system may be implemented via any suitable means known in the art.

Figure 9:
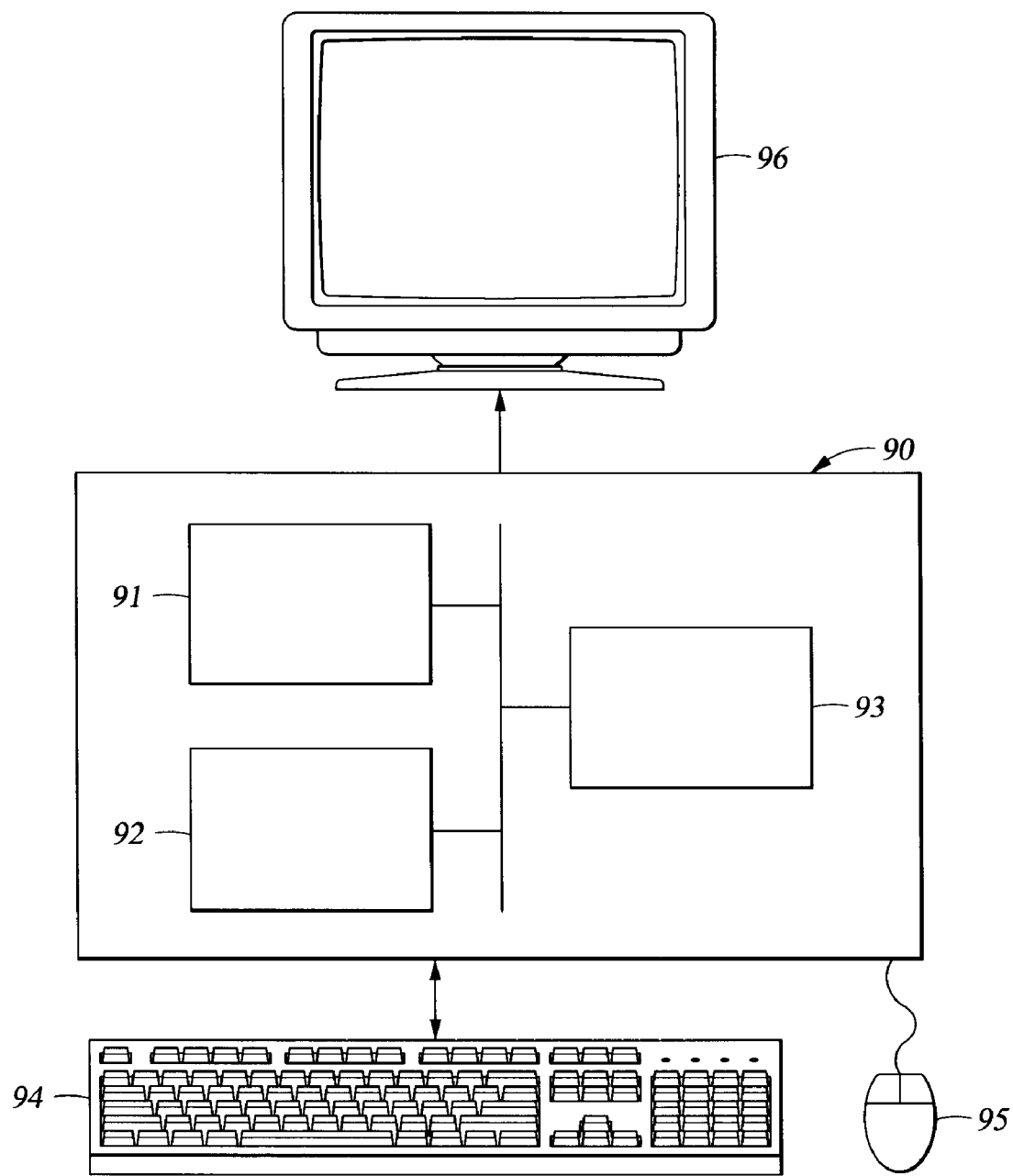
FIG. 9 shows a prior art computer system that can be used with embodiments of the invention.

Some embodiments of the invention relate to systems for detecting and monitoring kick based on mud slowness derived from sonic logs. A system in accordance with embodiments of the invention may include a sonic sensor (e.g., tool 20 in FIG. 2), a processor unit (25 in FIG. 2) or a surface computer (16 in FIG. 1), and a telemetry link (e.g., mud channel 9 in FIG. 1). The surface computer 16 or the downhole processor unit 25 may be generally referred to as a "circuitry." FIG. 9 shows a general computer that may be used as the surface computer 16. A downhole processing unit 25 may have similar components. As shown, a surface computer may include a processor (91 in FIG. 9), a storage medium 92 (e.g., a hard drive), and a random-access memory 93, in addition to input devices (e.g., keyboard 94 and mouse 95) and output devices (e.g., CRT display 96). The memory 92 stores a program having instructions for performing a method of the invention as described above. In addition, some embodiments of the invention relate to recording media storing a program that includes instructions for performing a method of the invention. The recording media may be any known or later developed means.

The techniques of the invention provide beneficial advantages. Embodiments of the invention provide a convenient and effective way to detect a kick in a wellbore. When applied in while-drilling applications, the disclosed techniques can measure mud slowness very close to the drill bit to provide early warning of an incipient kick. Embodiments of the invention may be implemented with conventional sonic tools, with or without modifications. Furthermore, embodiments of the invention may be used while drilling or after drilling (e.g., for monitoring a production well).

What is claimed is:

1. A method for detecting a kick in a borehole, comprising:
    acquiring a set of measurements with a sonic tool in the borehole;
    determining borehole mud slowness from the set of measurements; and
    comparing the mud slowness with a selected criterion to detect a kick in a borehole,
        wherein the determining the mud slowness comprises determining fluid mode slowness as a function of frequency for at least one fluid mode, and determining the mud slowness from a high frequency asymptotic value of the fluid mode slowness.

2. The method of claim 1, wherein the determining fluid mode slowness as a function of frequency comprises:
    estimating normalized wave numbers for the at least one fluid mode;
    unwrapping the normalized wave numbers to compute the fluid mode slowness for the at least one fluid mode at all frequencies; and
    generating a histogram of the fluid mode slowness versus frequency for the at least one fluid mode.

3. The method of claim 2, wherein the determining the mud slowness is by identifying a maximum fluid mode slowness from the histogram.

4. The method of claim 2, further comprising inspecting the normalized wave numbers to remove zero value wave numbers from the normalized wave numbers.

5. The method of claim 1, wherein the determining the mud slowness comprises plotting the fluid mode slowness as a function of frequency and determining a maximum slowness from an asymptotic approach of the fluid mode slowness as a function of frequency in a high frequency region.

6. The method of claim 1, further comprising sending a warning signal uphole if the mud slowness exceeds the selected criterion.

7. The method of claim 1, wherein the set of measurements comprise signals in a frequency range of 5 KHz to 500 KHz.

8. The method of claim 1, wherein the set of measurements comprise signals in a frequency range of 10 KHz to 100 KHz.

9. A system for detecting a kick in a borehole, comprising:
    a sonic sensor configured to acquire a set of sonic measurements in the borehole; and
    circuitry configured to determine borehole mud slowness from the set of sonic measurements and to compare the determined mud slowness with a selected criterion, wherein the mud slowness is determined from a fluid mode slowness derived from the set of sonic measurements and an asymptotic approach of the fluid mode slowness towards a limiting value in a high frequency region.

10. The system of claim 9, wherein the fluid mode slowness is determined by:
    estimating normalized wave numbers for a fluid mode;
    unwrapping the normalized wave numbers to compute the fluid mode slowness for the fluid mode at all frequencies; and
    generating a histogram of the fluid mode slowness versus frequency for the fluid mode.

11. The system of claim 10, wherein the mud slowness is determined by identifying a maximum fluid mode slowness from the histogram.

12. The system of claim 10, further comprising removing zero value wave numbers from the normalized wave numbers.

13. The system of claim 9, wherein the sonic sensor is configured to acquire signals in a frequency range of 5 KHz to 500 KHz.

14. The system of claim 9, wherein the sonic sensor is configured to acquire signals in a frequency range of 10 KHz to 100 KHz.

15. The system of claim 9, further comprising a telemetry link configured to send a warning signal uphole when the mud slowness exceeds the selected criterion.

16. A system for detecting a kick in a borehole, comprising:
    a sonic sensor configured to acquire a set of sonic measurements in the borehole;
    processor means adapted to determine borehole mud slowness from the set of sonic measurements and to compare the determined mud slowness with a selected criterion, wherein the mud slowness is determined from a fluid mode slowness derived from the set of sonic measurements and an asymptotic approach of the fluid mode slowness towards a limiting value in a high frequency region; and
    the processor means configured to trigger a warning signal when the mud slowness exceeds the selected criterion.

17. The system of claim 16, wherein the fluid mode slowness is determined by:
    estimating normalized wave numbers for a fluid mode;
    unwrapping the normalized wave numbers to compute the fluid mode slowness for the fluid mode at all frequencies; and
    generating a histogram of the fluid mode slowness versus frequency for the fluid mode.

18. The system of claim 17, wherein the mud slowness is determined by identifying a maximum fluid mode slowness from the histogram.

* * * * *